United States Patent [19] [11] 4,154,332
Schlegel [45] May 15, 1979

[54] METHOD OF AND MEANS FOR HANDLING LOOSE BULK MATERIAL

[75] Inventor: Hans J. Schlegel, Minneapolis, Minn.

[73] Assignee: AB Vretstorp-Verken, Vretstorp, Sweden

[21] Appl. No.: 849,418

[22] Filed: Nov. 7, 1977

[51] Int. Cl.² .............................................. B65G 65/28
[52] U.S. Cl. .................................. 198/507; 198/508; 198/519; 414/133; 414/786
[58] Field of Search .................. 214/10, 17 CA, 18.2, 214/152; 198/358, 507, 508, 519, 585

[56] References Cited

U.S. PATENT DOCUMENTS

| | | | |
|---|---|---|---|
| 3,406,847 | 10/1968 | Sackett | 214/17 CA |
| 3,703,241 | 11/1972 | Kelly et al. | 214/10 X |
| 3,877,585 | 4/1975 | Burgess | 214/17 CA |
| 4,002,251 | 1/1977 | Burgess | 198/585 X |

FOREIGN PATENT DOCUMENTS 2330758  1/1975 Fed. Rep. of Germany ............. 214/10

*Primary Examiner*—L. J. Paperner

[57] ABSTRACT

Loose bulk material, such as gravel or the like, is moved by a conveyor or the like from an initial station to a storage area or to a final station where it is utilized in some manner, such as being mixed with other material. When the level of the loose bulk material at the final station is at a maximum level, any loose bulk material coming from the initial station will be conveyed to the storage area where it will be stacked into a storage pile having a predefined shape. When the level of loose bulk material at the final station drops to or below a minimum level, any loose bulk material coming from the initial station will be conveyed directly to the final station. In addition, loose bulk material will be reclaimed from the storage pile in a predefined pattern so as to leave any remainder of the storage pile in a portion of the predefined shape. Once the level of loose bulk material at the final station again reaches the maximum level, any loose bulk material coming from the initial station will be again conveyed to the storage area and stacked onto any remainder of the storage pile in a predefined pattern to restack at least a portion of any remainder of the storage pile in the predefined shape.

4 Claims, 17 Drawing Figures

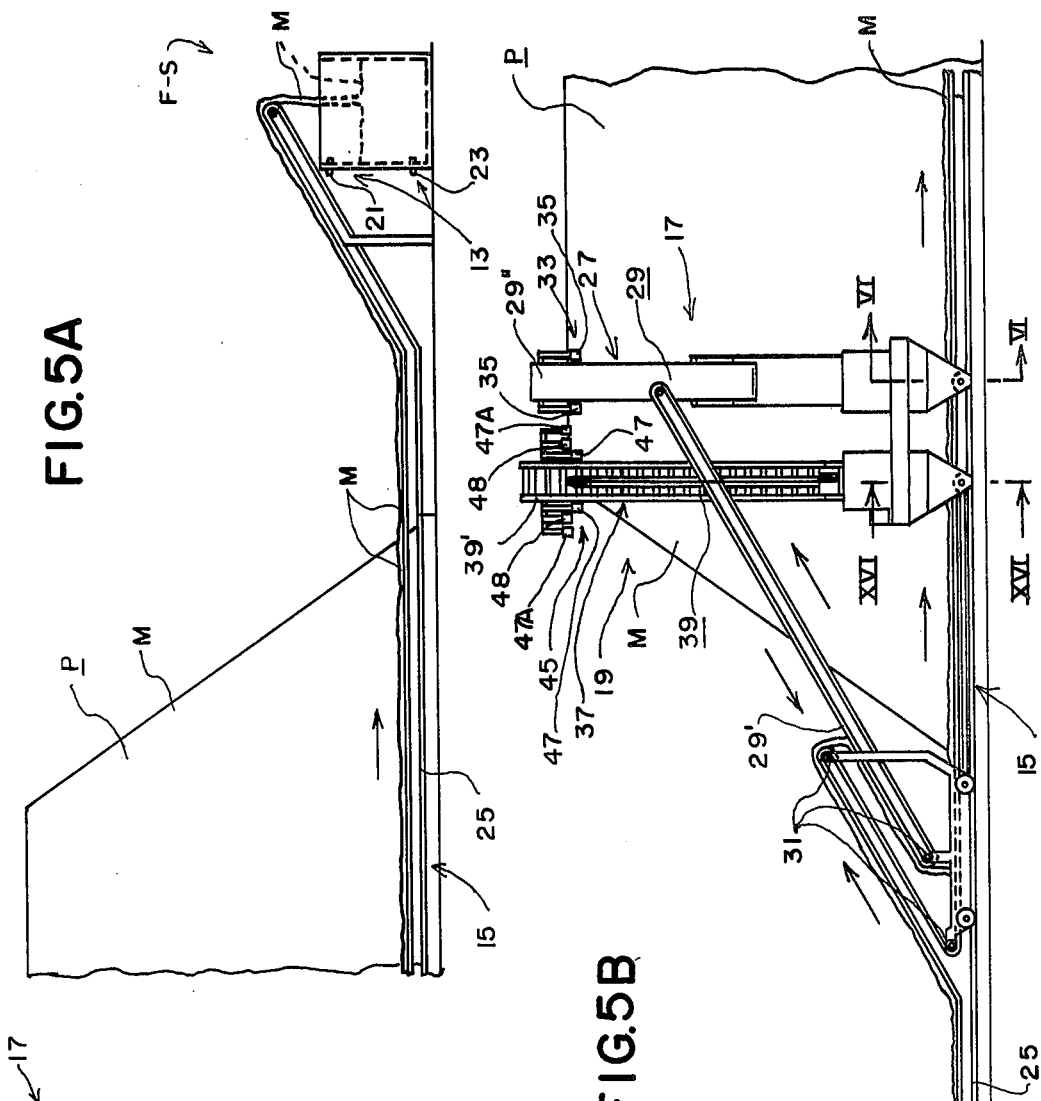
FIG.5A
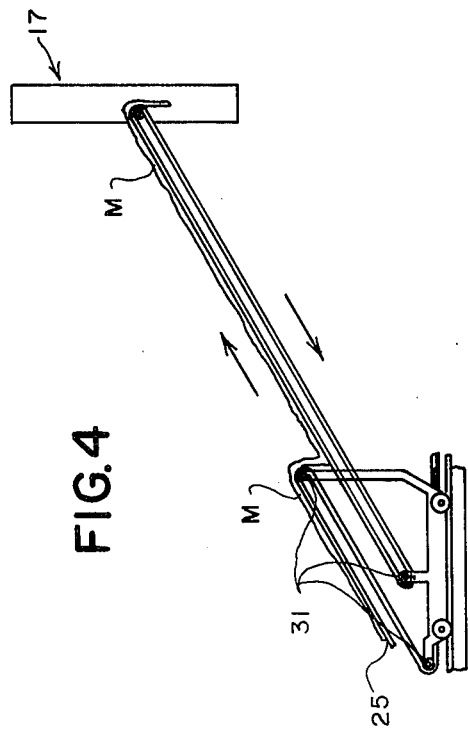
FIG.4
FIG.5B

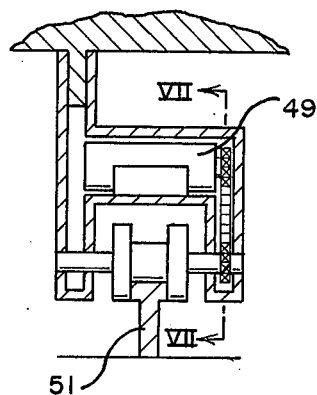
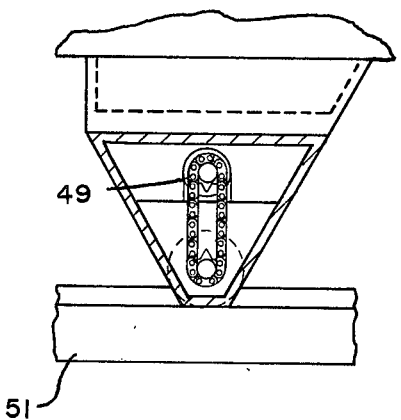
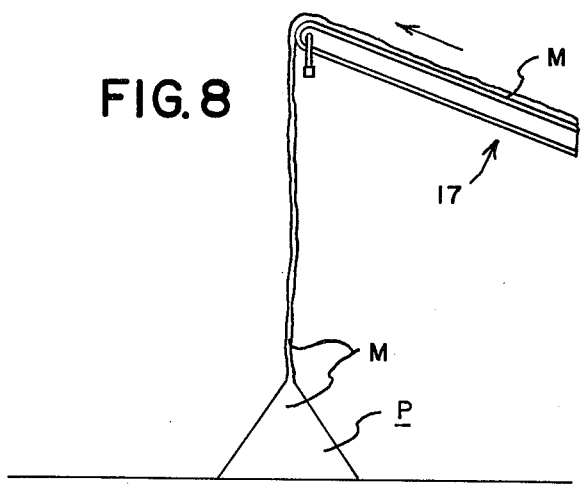
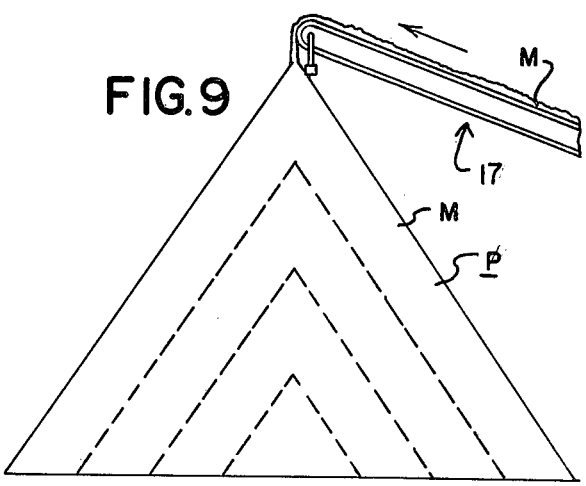
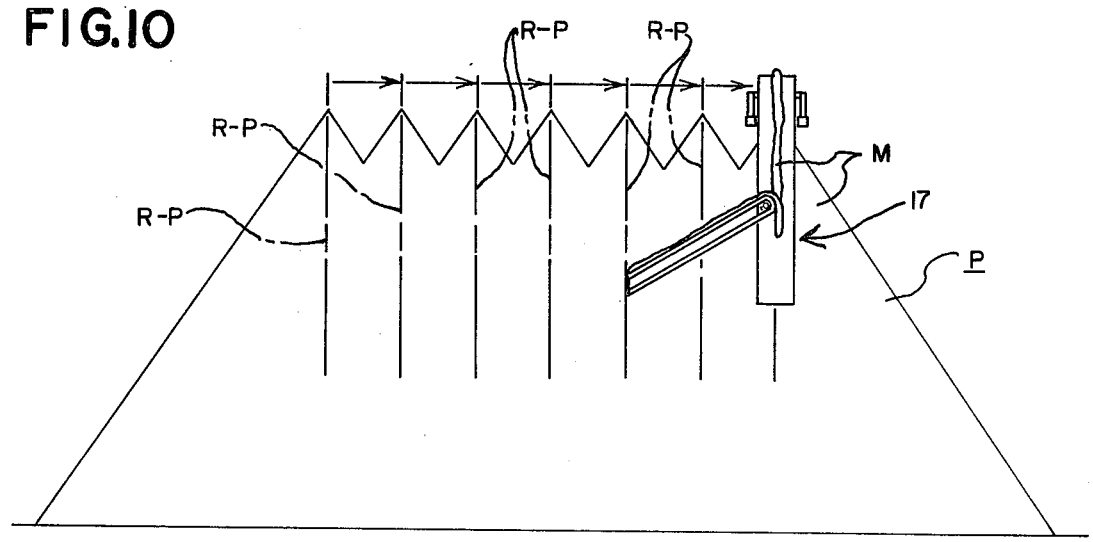

1

METHOD OF AND MEANS FOR HANDLING LOOSE BULK MATERIAL

BACKGROUND OF THE INVENTION

1. Field of the invention

This invention relates generally to methods of and means for handling loose bulk material and more specifically to methods of and means for conveying and storing loose bulk material between and among an initial station, a storage pile, and a final station.

2. Description of the Prior Art

Heretofore, various methods of and means for conveying and storing loose bulk material between and among an initial station, a storage pile, and a final station have been developed. Typically, these prior methods and means include a conveyor for moving loose bulk material from an initial station to a storage pile, a manually operated stacker for allowing a worker-operator to stack such loose bulk material onto the storage pile, and a manually operated reclaimer for allowing another worker-operator to reclaim such loose bulk material from the storage pile and transfer it to a final station where it is utilized. Such methods and means are disadvantageous since, for example, they require one or more persons to control the stacker and reclaimer functions thereof and cannot therefore be made completely automatic.

SUMMARY OF THE INVENTION

The present invention is directed towards overcoming the problems and disadvantages of prior methods of and means for handling loose bulk material. The concept of the present invention is to provide a method of and a means for handling loose bulk material in which a storage pile of the loose bulk material is built, reclaimed and refilled in a pattern which always creates a pile of predetermined shape with regard to a reference position. Thic concept allows the loose bulk material to be stacked and reclaimed completely automatically.

In general, the present invention includes the steps of stacking loose bulk material into a storage pile having a predefined shape; reclaiming loose bulk material from the storage pile in a predefined pattern to leave any remainder of the storage pile in a portion of the predefined shape; and stacking loose bulk material onto any remainder of the storage pile in a predefined pattern to restack at least a portion of the remainder of the storage pile in the predefined shape.

BRIEF DESCRIPTION OF THE DRAWINGS

FIG. 4 is a detailed view of a portion thereof.

FIGS. 5A and 5B are a side elevational view thereof as taken on line V—V of FIG. 3.

FIG. 6 is a sectional view of a portion thereof as taken on line VI—VI of FIG. 5B.

FIG. 7 is an end elevational view of a portion thereof as taken on line VII—VII of FIG. 6.

FIG. 8 is a detailed view of a portion thereof showing loose bulk material being transferred to the storage pile.

FIG. 9 is a view similar to FIG. 8 but showing the storage pile in a later stage of development.

FIG. 10 is a somewhat diagrammatic side elevational view of a portion thereof showing the storage pile being built along a plurality of reference positions.

DESCRIPTION OF THE PREFERRED EMBODIMENT

Figure 1:
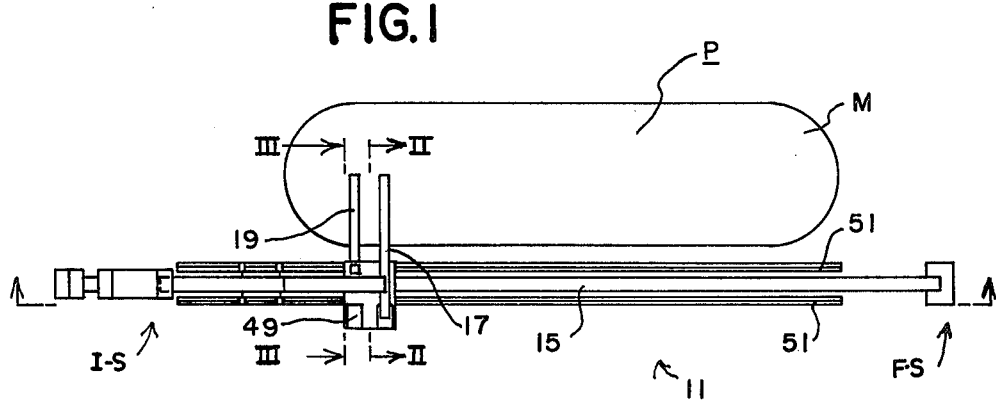
FIG. 1 is a somewhat diagramatic top plan view of a loose bulk material handling system utilizing the present invention.
Figure 2:
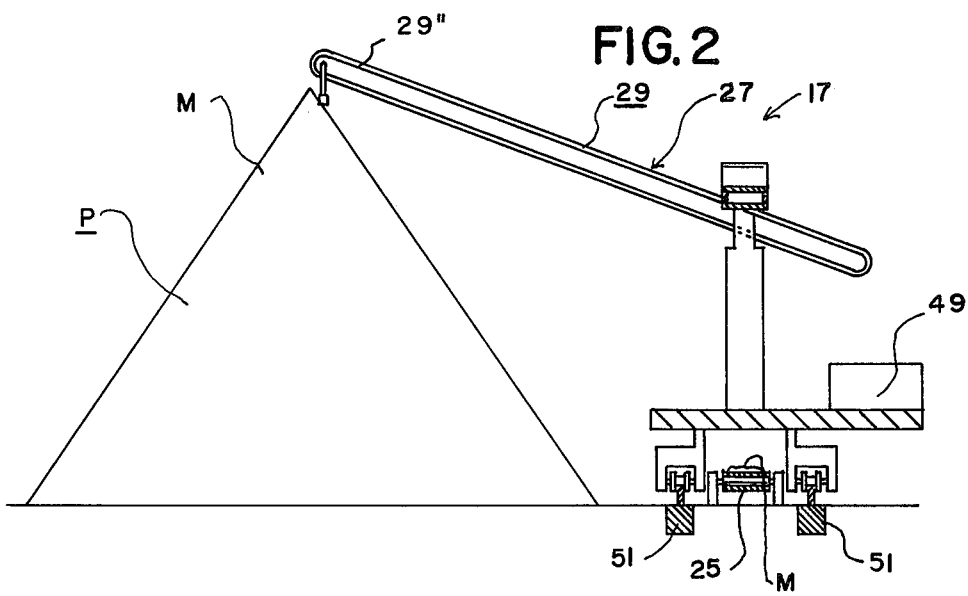
FIG. 2 is a partially sectional view thereof as taken on line II—II of FIG. 1.
Figure 3:
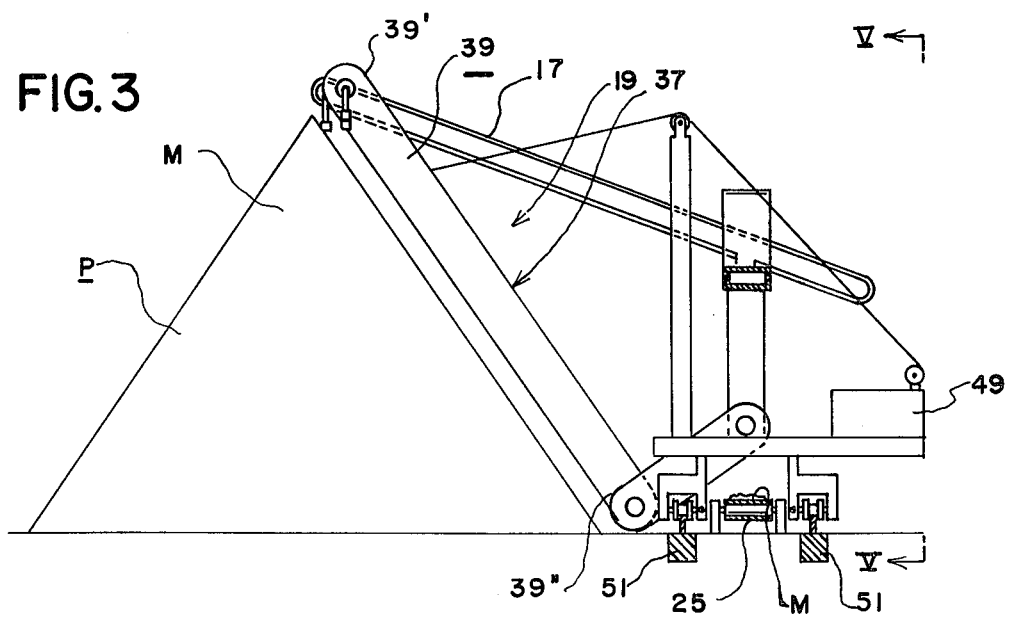
FIG. 3 is a partially sectional view thereof as taken on line III—III of FIG. 1.

The present invention is for use in a loose bulk material handling system which includes, in general, an initial station IS such as an unloading dock where trucks, boats, etc., carrying loose bulk material M such as gravel, limestone, wood chips or the like are unloaded, and a final station FS such as a surge bin of a furnace or the like where raw material such as the loose material M is utilized in some manner such as being fed into a furnace or the like (see, for example, FIGS. 1, 5, 13 and 14). The means 11 for handling loose material of the present invention includes, in general, indicator means 13 for indicating when the level of loose bulk material M at the final station FS is sufficient or insufficient for the specific use to be made of it; conveyor means 15 for conveying the loose bulk material M from the initial station IS to the final station FS; stacker means 17 for transferring any loose bulk material M being transported along the conveyor means 15 to a storage pile P when the indicator means 13 indicates that the level of loose bulk material M at the final station FS is sufficient; and reclaimer means 19 for transferring loose bulk material M from the storage pile P to the conveyor means 15 when the indicator means 13 indicates that the level of loose bulk material M at the final station FS is insufficient.

The indicator means 13 may consist of any means known to those skilled in the art for indicating whether the level of the loose bulk material M at the final station FS is sufficient or insufficient. For example, the indicator means 13 may include a first on-off switch 21 which is activated or deactivated by the loose bulk material M at the final station FS when the level thereof is at or above a certain predetermined sufficient level to activate the stacker means 17 to transfer any loose material M being conveyed on the conveyor means 15 from the conveyor means 15 to the storage pile P, and may include a second on-off switch 23 which is activated or deactivated by the loose bulk material M at the final station FS when the level thereof is at or below a certain predetermined insufficient level to activate the reclaimer means 19 to transfer loose bulk material M from the storage pile P to the conveyor means 15 and/or to allow any loose bulk material M being conveyed from the initial station IS to be conveyed directly to the final station FS (see, in general, FIG. 5A).

The conveyor means 15 may consist of any means known to those skilled in the art for conveying the loose bulk material M from the initial station IS to the final station FS. For example, the conveyor means 15 may include one or more endless motor-driven belts 25 position between the initial station IS and the final station FS in any manner apparent to those skilled in the art to allow loose bulk material M to be positioned on top thereof and to be conveyed from the initial station IS to the final station FS (see, in general, FIGS. 1, 5, 13 and 14).

The stacker means 17 will build a conical pile about a first or original reference position RP (see FIG. 10). Added layers may be stacked onto that conical pile to form a storage pile P of predefined and predetermined direction and shape, depending on the amount of loose bulk material M received from the initial station IS. By using a sensor actuated travel drive for moving the stacker unit along the length of the predefined storage pile P, the top of the storage pile P will have a predefined and predetermined height as long as the storage pile P is not reclaimed. The storage pile P thus stacked will have a number of reference positions RP (see FIG. 10). For example, the storage pile P will have a first or original reference position RP at the location of the first conical pile and will have other reference positions RP at the location of each additional layer to the location of the last additional layer which has reached the predefined height. For adding additional material M to the storage pile P, the stacker means 17 normally travels back to one of these reference positions RP. Additionally to these reference positions RP there may be more than one original reference position located along the pile P. The stacker means 17 may include a substantially typical boom member 27 well known to those skilled in the art for use in loose bulk material handling systems. In general, the boom member 27 includes a conveyor means 29 having a first end 29' positioned so as to receive loose bulk material M from the conveyor means 15 and having a second end 29" positioned so as to discharge loose bulk material M therefrom onto the storage pile P (see, in general, FIGS. 4 and 5B). The conveyor means 15 may be adapted to deposit the loose bulk material M onto the first end 29' of the conveyor means 29. For example, the belt 25 of the conveyor means 15 may be arranged over a series of rollers 31 or the like so as to form a substantially S-shaped bend in the conveyor means 15 adjacent the first end 29' of the conveyor means 29 to thereby cause any loose bulk material M being conveyed over the conveyor means 15 to be deposited on the first end 29' of the conveyor means 29 (see, in general, FIG. 4). When the conveyor means 15 is thus adapted, the conveyor means 29 is adapted to cause the loose bulk material M deposited thereon to be conveyed in either a forward direction towards the second end 29" thereof or in a reverse direction towards the first end 29' thereof. The rollers 31 are preferably attached to the first end 29' of the conveyor means 29 in such a manner that when the first end 29' of the conveyor means 29 is moved, the S-shaped bend in the conveyor means 15 will move with it. When the thus adapted conveyor means 29 is in a forward mode, any loose bulk material M deposited thereon will be deposited on the storage pile P (see FIG. 4). On the other hand, when the thus adapted conveyor means 29 is in a reverse mode, any loose bulk material M deposited thereon will be redeposited on the conveyor means 15 at substantially the bottom of the S-shaped bend therein for being conveyed to the final station FS (see FIG. 5B).

The stacker means 17 preferably includes sensor means 33 for sensing when the particular section of the storage pile P being stacked when the conveyor means 29 is in the forward mode has reached the predefined height. The sensor means 33 may consist of any means known to those skilled in the art for sensing when the height of a particular section of the storage pile P has reached a predefined height. For example, the sensor means 33 may include two on-off switches 35 positioned adjacent the second end 29" of the conveyor means 29 (see, in general, FIG. 5B) for being activated or deactivated by the loose bulk material M in the storage pile P when the particular section of the storage pile P under the second end 29" of the conveyor means 29 has reached a certain predefined height as should now be apparent to those skilled in the art.

Figure 11:
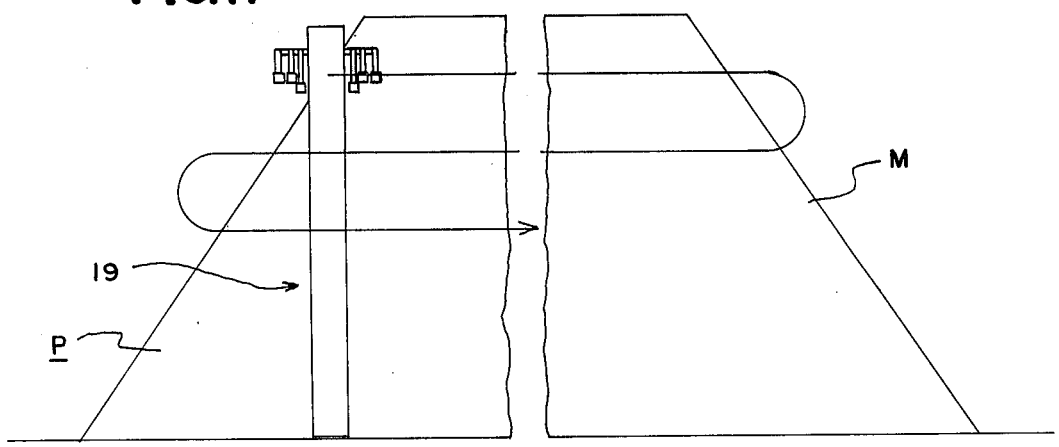
FIG. 11 is a somewhat diagramatic side elevational view of a portion thereof showing the movement of the reclaimer means in reclaiming loose bulk material from the storage pile.
Figure 12:
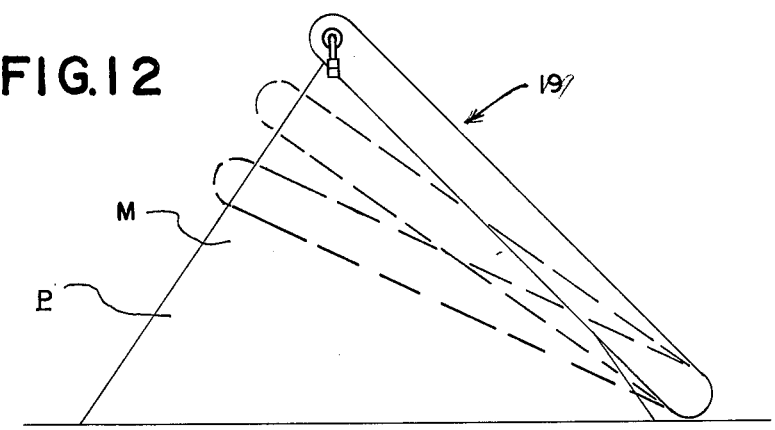
FIG. 12 is a somewhat diagramatic end elevational view of FIG. 11.
Figure 13:
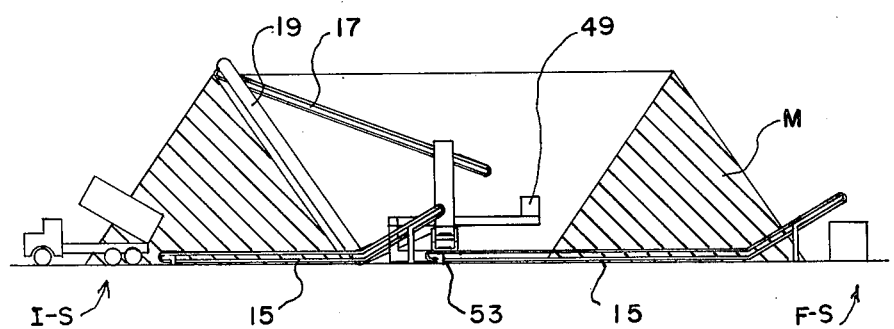
FIG. 13 is a side elevational view of another loose bulk material handling system utilizing the present invention.
Figure 14:
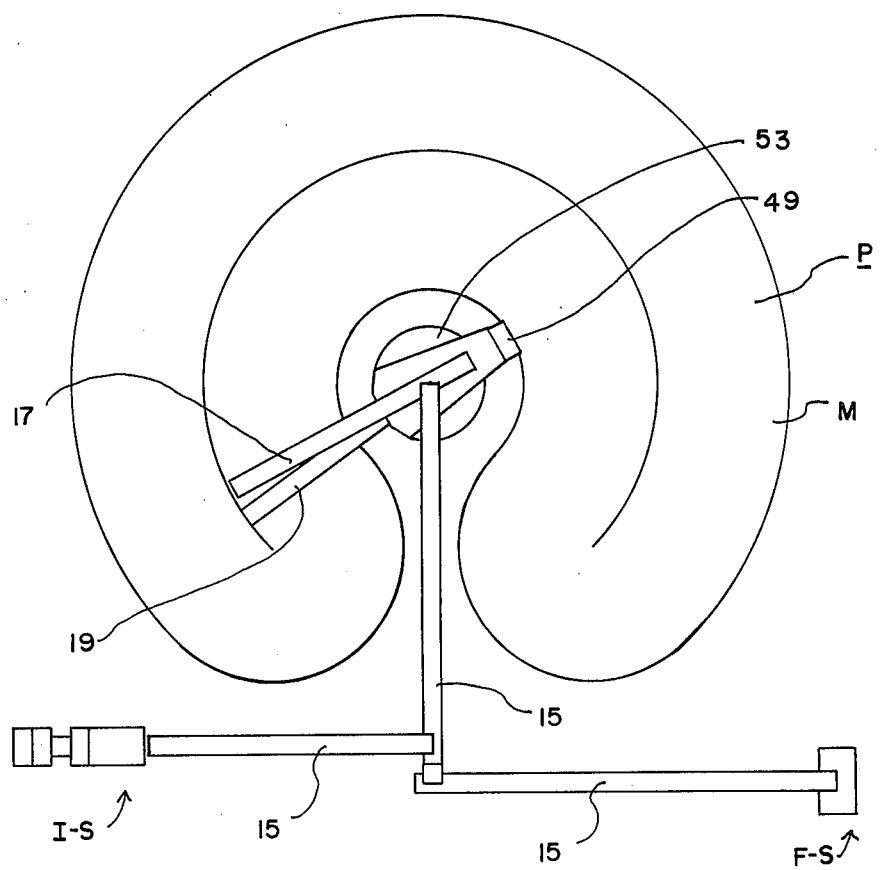
FIG. 14 is a top plan view of FIG. 13.
Figure 15:
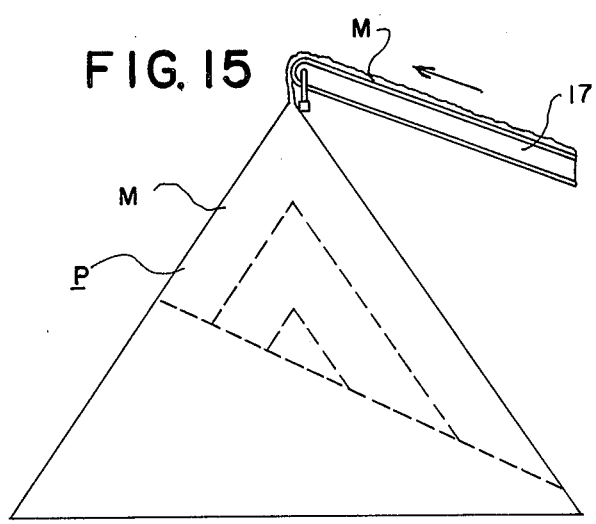
FIG. 15 is a somewhat diagramatic end elevational view similar to FIG. 12 but showing the storage pile being refilled after being partially reclaimed.

The means 11 preferably includes means for moving the second end 29" of the conveyor means 29 from a particular section of the storage pile P which has been stacked to the predefined height to a location directly adjacent thereto allowing any loose bulk material M being expelled from the second end 29" of the conveyor means 29 to be deposited on another particular section of the storage pile P about a reference position RP directly adjacent to the particular section of the storage pile P that has reached the predefined height. It should be noted that the top of the storage pile P will be substantially smooth as shown in FIGS. 5, 11 and 13 and that the top of the storage pile P is shown in FIG. 10 as having a shape similar to a series of saw teeth for purposes of illustration only to clearly show a plurality of reference positions. The means for moving the second end 29' of the conveyor means 29 is activated when the on-off switches 35 are activated or deactivated in a manner which should now be apparent to those skilled in the art. The specific, preferred construction of the means for moving the second end 29" of the conveyor means 29 is well known to those skilled in the art.

Figure 16:
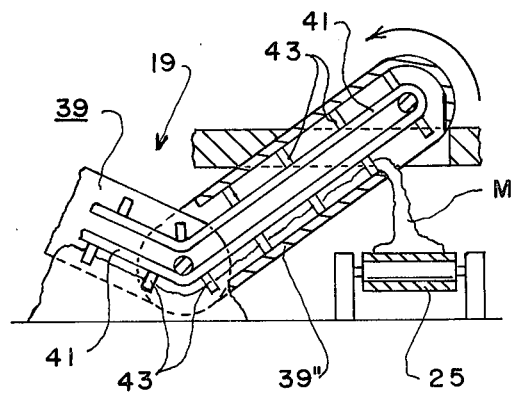
FIG. 16 is a partially sectional view as taken on line XVI—XVI of FIG. 5B.

The reclaimer means 19 will, independent of the shape of the storage pile P, always start to reclaim material M from the storage pile P at the highest point of the pile P. For example, if a first section of the pile P has been stacked to the full or predefined height, a second section being partially stacked or reclaimed, and a last section being empty, the reclaimer means 19 will first reclaim material M from the first section of the pile P and, when the first section has been reclaimed to the height of the second section, will then reclaim material M from the first and second sections, moving back and forth along the length of the first and second sections. The reclaimer means 19 may include a substantially typical boom member 37 well known to those skilled in the art for use in loose bulk material handling systems. In general, the boom member 37 includes a transporter means 39 having a first end 39' positioned so as to reclaim loose bulk material M from the storage pile P and having a second end 39" positioned so as to discharge or expel any loose bulk material M reclaimed from the storage pile P onto the conveyor means 15 for being conveyed to the final station FS. The transporter means 39 preferably includes an endless motor-driven chain means 41 having a plurality of outwardly extending rake members 43 attached thereto (see, in general, FIG. 16) for reclaiming loose bulk material M from the storage pile P by raking loose bulk material M downward from the first end 39' of the transporter means 39 to the second end 39" thereof and to the conveyor means 15 in a manner which should now be apparent to those skilled in the art.

The reclaimer means 19 preferably includes sensor means 45 for sensing the height of the storage pile P adjacent the first end 39' of the transporter means 39. The sensor means 45 may consist of any means known to those skilled in the art for sensing the height of the storage pile P adjacent the first end 39' of the transporter means 39. For example, the sensor means 45 may consist simply of four on-off switches 47 and 47A (see, in general, FIG. 5B) which are activated or deactivated by contacting or not contacting the storage pile P adjacent the first end 39' of the transporter means 39. The reclaimer means 19 may include sensor means 48 positioned adjacent the first end 39' of the transporter means 39 (see, in general, FIG. 5B) for acting as a safety device to, in the event that the stacker means 17 has stacked a section of the storage pile P to a height higher than the predefined height, by mistake or malfunction, stop travel of the reclaimer means 19, or stop and reverse travel of the reclaimer means 19, or stop the travel of the reclaimer means 29 and lift the first end 39' of the transporter means 39 to clear that section of the Pile P. Additionally sensor 48 can also electrically be interlocked in such a way that the boom raises (continuously or stepwise) while the pile grows or the boom can automatically be lowered when required and thus sensing at any time the pile height before the predetermined pile height is reached and thus providing a newly created pile height. The sensor means 48 may consist of any means well known to those skilled in the art such as two on-off switches.

The means 11 preferably includes means for moving the first end 39' of the transporter means 39 back and forth along the length of the storage pile P and up and down relative to the height of the storage pile P in response to the sensor means 45 for reclaiming loose bulk material M continuously from the highest portions of the storage pile P.

The means for moving the first end 29' of the conveyor means 29 and the means for moving the first end 39' of the transporter porter means 39 may include separate motor means for moving the second end 29" of the conveyor means 29 and the first end 39' of the transporter means 39 back and forth along the length of the storage pile P. More specifically, the means 11 may include one or more electric or gas motors 49 for moving the first end 39' of the transporter 39 up and down relative to the height of the storage pile P and for moving the stacker means 17 and reclaimer means 19 back and forth along an elongated rail means 51 which is positioned along the length of the storage pile P (see, in general, FIGS. 1, 2, 3, 6 and 7) whereby the storage pile P will have a substantially enlongated, lineal shape. On the other hand, the motor 49 may cause the stacker means 17 and reclaimer means 19 to move about a pivot means 53 whereby the storage pile P will have a substantially partial or full circular shape (see FIGS. 13 and 14). It should be noted that the second end 29" of the conveyor means 29 of the stacker means 17 may be adapted to be moved up and down relative to the height of the storage pile P for reducing the amount of dust or the like which may be produced when the loose bulk material M is dropped from the second end 29" of the conveyor means 29 as should now be apparent to those skilled in the art.

The preferred method of operation of the present invention is quite simple. When loose bulk material M is being conveyed from the initial station IS and the indicator means 13 indicates that the level of loose bulk material M at the final station FS is insufficient, the entire flow of loose bulk material M will be conveyed to the final station FS. Simultaneously, loose bulk material M may be reclaimed from the storage pile P and deposited on the conveyor means 15 by the reclaimer means 19 for being conveyed to the final station FS.

When no loose bulk material M is being conveyed from the initial station IS and the indicator means 13 indicates that the level of loose bulk material M at the final station FS is insufficient, loose bulk material M will be reclaimed from the storage pile P and conveyed to the final station FS.

When loose bulk material M is being conveyed from the initial station IS and the indicator means 13 indicates that the level of loose bulk material M at the final station FS is sufficient, the loose bulk material M being conveyed will be stacked onto the storage pile P by the stacker means 17. The stacker means 17 will build a storage pile P about a reference position RP in a predefined shape depending on the amount of loose bulk material M received from the initial station IS. The sensor means 33 will actuate the means for moving the second end 29' of the conveyor means 29 of the stacker means 17 back or forth along the length of the storage pile P when the height of the portion of the storage pile P directly under the second end 29" of the conveyor means 29 has reached a certain predefined height to thereby build a storage pile P of predefined shape and height about a plurality of reference positions RP. When loose bulk material M is being reclaimed from the storage pile P, the sensor means 45 will cause the reclaimer means 19 to first reclaim loose bulk material M from the highest portions of the storage pile P. For example, when a first specific portion of the storage pile P is filled or stacked to the predefined maximum height, an adjacent portion of the storage pile P filled to a height below the predefined maximum height, and the portion of the storage pile P adjacent thereto being empty, the reclaimer means 19 will first reclaim loose bulk material M from the section of the storage pile P that was stacked to the predefined maximum height and when that section of the storage pile P is reclaimed to the height of the adjacent section thereof, the reclaimer means 19 will move back and forth along both sections of the storage pile to reclaim loose bulk material M from both sections. In this manner, the present invention provides a method of and means for handling loose bulk material in a fully automatic operation and allows a storage pile P to be built, reclaimed and refilled in a pattern which always creates a storage pile of predetermined shape with regard to one or more reference positions. Such a system is always capable of an immediate response while in an automatic mode and allows incoming material to be properly processed regardless of whether the level of material at the final station is at a maximum level or not. Likewise, it allows material to be immediately supplied to the final station regardless of whether such material is available at the initial station. In brief, the present invention allows loose bulk material to be handled as follows:

1. When material is present at the initial station and no material is required at the final station, all material is stacked onto the storage pile.

2. When material is present at the initial station and material is required at the final station, all material is conveyed to the final station.

3. When no material is present at the initial station and mo material is required at the final station, the system is at idle but is prepared to respond to the next need (stacking or reclaiming) without delay.

4. When no material is present at the initial station and material is required at the final station, material is reclaimed from the storage pile and conveyed to the final station. Any change from one of the above mentioned operational features to another is accomplished in full automatic operation without any delay since the stacker and reclaimer means 17, 19 are always in position to fill, reclaim, and/or refill the storage pile P from one or between two or more reference positions RP. Between two or more reference positions RP it also allows a filling method known as "chevron piling" which is accomplished while filling and traveling (right to left and vice versa) between two set points.

Although the invention has been described and illustrated with respect to a preferred embodiment thereof, it is not to be so limited since changes and modifications may be made therein which are within the full intended scope of the invention.

I claim:

1. A method of handling loose bulk material, said method comprising:
   (a) stacking said loose bulk material into a storage pile of predefined height by first stacking said loose bulk material into an initial pile of predefined height centered about an initial reference position and then stacking said loose bulk material into one or more secondary piles of predefined height adjacent said initial pile one after the other;
   (b) reclaiming said loose bulk material from said storage pile by first reclaiming said loose bulk material from said initial and secondary piles which have been stacked to said predefined height and then, after said initial and secondary piles whch were stacked to said predefined height have been reclaimed to a height equal to one or more other piles of said storage pile, reclaiming said loose bulk material from said initial and secondary piles and said one or more other piles of said storage pile;
   (c) then restacking said reclaimed storage pile with said loose bulk material by first stacking said loose bulk material into an actual pile of predefined height and centered about an actual reference point and then stacking said loose bulk material into one or more secondary piles of predefined height one after the other adjacent and on one side of said actual pile; and
   (d) then reclaiming said loose bulk material from said storage pile by first reclaiming said loose bulk material from said actual and secondary piles which were restacked to said predefined height and then, after said actual and secondary piles which were restacked to said predefined height have been reclaimed to a height equal to one or more other piles of said storage pile, reclaiming said loose bulk material from said actual and secondary piles which were restacked to said predefined height and said one or more other piles.

2. An automatic method of handling loose bulk material in a system which includes a conveyor means for conveying said loose bulk material from an initial station to a storage pile or to a final station having means for indicating when the level of said loose bulk material thereat is sufficient or insufficient, a stacker for transferring said loose bulk material from said conveyor means to said storage pile when the level of said loose bulk material at said final station is sufficient, and a reclaimer for transferring said loose bulk material from said storage pile to said conveyor means when the level of said loose bulk material at said final station is insufficient, said stacker and said reclaimer being associated with one another for movement with one another back and forth along the length of said storage pile, said method comprising:
   (a) stacking said loose bulk material onto said storage pile when the level of said loose bulk material in said final station is sufficient by first stacking said loose bulk material into an initial pile of predetermined height centered about an initial reference position and then stacking said loose bulk material into one or more secondary piles of predefined height one after the other adjacent said initial pile until all of said loose bulk material at said initial station has been stacked onto said storage pile or until the level of said loose bulk material at said final station becomes insufficient;
   (b) reclaiming said loose bulk material from said storage pile when the level of said loose bulk material at said final station is insufficient by first reclaiming said loose bulk material from the portion of said storage pile which has been stacked to said predefined height and then, after said portion of said storage pile which was stacked to said predefined height has been reclaimed to a height equal to other portions of said storage pile, reclaiming said loose bulk material from the highest portions of said storage pile;
   (c) then restacking said reclaimed storage pile with said loose bulk material from said initial station after the level of said loose bulk material at said final station has risen to a sufficient level by first stacking said loose bulk material into an actual pile of predefined height centered about a reference position which may be the actual pile with its predetermined height and then stacking said loose bulk material into one or more secondary piles of predefined height one after the other adjacent said actual pile until all of said loose bulk material at said initial station has been stacked onto said storage pile or until the level of said loose bulk material at said final station has become insufficient; and
   (d) then reclaiming said loose bulk material from said storage pile when the level of said loose bulk material at said final station has become insufficient by first reclaiming said loose bulk material from the portion of said storage pile which has been stacked or restacked to said predefined height and then, after said portion of said storage pile which was stacked or restacked to said predefined height have been reclaimed to a height equal to other portions of said storage pile, reclaiming said loose bulk material from the highest remaining portions of said storage pile until said loose bulk material is being reclaimed from the entire length of said storage pile or until the level of said loose bulk material in said final station has become sufficient.

3. An automatic method of handling loose bulk material in a system which includes a conveyor means for conveying said loose bulk material from an initial station to a storage pile or to a final station having means for indicating when the level of said loose bulk material thereat is sufficient or insufficient, a stacker for transferring said loose bulk material from said conveyor means to said storage pile when the level of said loose bulk material at said final station is sufficient, and a reclaimer for transferring said loose bulk material from said storage pile to said conveyor means when the level of said loose bulk material at said final station is insufficient, said stacker and said reclaimer being associated with one another for movement with one another back and forth along the length of said storage pile, said method comprising:

(a) stacking said loose bulk material onto said storage pile when the level of said loose bulk material in said final station is sufficient by first stacking said loose bulk material into an initial pile of predetermined height and length between two or more reference positions and then stacking said loose bulk material into one or more secondary piles of predefined height and length one after the other adjacent or optionally not adjacent said initial pile until all of said loose bulk material at said final station becomes insufficient;

(b) reclaiming said loose bulk material from said storage pile when the level of said loose bulk material at said final station is insufficient by first reclaiming said loose bulk material from the portion of said storage pile which has been stacked to said predefined height and then after said portion of said storage pile which was stacked to said predefined height has been reclaimed to a height equal to other portions of said storage pile, reclaiming said loose bulk material from the highest portions of said storage pile;

(c) then restacking said reclaimed storage pile with said loose bulk material from said initial station after the level of said loose bulk material at said final station has risen to a sufficient level by first stacking said loose bulk material into an actual pile of predefined height and length between two or more reference positions of which at least one may be the actual pile with its predefined height and then stacking said loose bulk material into one or more secondary piles of predefined height and length one after the other adjacent or optionally not adjacent said actual pile until all of said loose bulk material at said initial station has been stacked onto said storage pile or until the level of said loose bulk material at said final station has become insufficient; and (d) then reclaiming said loose bulk material from said storage pile when the level of said loose bulk material at said final station has become insufficient by first reclaiming said loose bulk material from the portion of said storage pile which has been stacked or restacked to said predefined height and then, after said portion of said storage pile which was stacked or restacked to said predefined height have been reclaimed to a height equal to other portions of said storage pile, reclaiming said loose bulk material from the highest remaining portions of said storage pile until said loose bulk material is being reclaimed from the entire length of said storage pile or until the level of said loose bulk material in said final station has become sufficient.

4. Means for handling loose bulk material in a system which includes an initial station for initially receiving said loose bulk material, a storage pile for storing said loose bulk material, and a final station for utilizing said loose bulk material, said means comprising:

(a) indicator means for indicating when the level of said loose bulk material at said final station is sufficient or insufficient;

(b) conveyor means for conveying said loose bulk material from said initial station to said final station;

(c) stacker means for transferring said loose bulk material from said conveyor means to said storage pile when said indicator means indicates that the level of said loose bulk material at said final station is sufficient and for stacking said loose bulk material onto said storage pile in a plurality of piles of predefined height one after the other in conjunction with one or more reference positions, said stacker means including a conveyor means for transporting said loose bulk material from said conveyor means to said storage pile, said conveyor means of said stacker means including a first end for receiving said loose bulk material from said conveyor means and a second end for expelling said loose bulk material onto said storage pile, said stacker means including sensor means for sensing when the pile being stacked has reached said predefined height;

(d) reclaimer means for transferring said loose bulk material from said storage pile to said conveyor means when said indicator means indicates that the level of said loose bulk material at said final station is insufficient said reclaimer means including a transporter means for transporting said loose bulk material from said storage pile to said conveyor means, said transporter means including a first end for receiving said loose bulk material from said storage pile and a second end for expelling said loose bulk material onto said conveyor means, said reclaimer means including sensor means for sensing the height of said storage pile; and (e) means for moving said second end of said conveyor means of said stacker means from a pile that has been stacked to said predefined height to a location directly adjacent thereto to allowing another pile to be stacked directly adjacent thereto when said sensor means of said stacker means senses that said pile being stacked has reached said predefined height and for moving said first end of said transporter means of said reclaimer means back and forth along the length of said storage pile and up and down relative to the height of storage pile in response to said sensor means of said reclaimer means for reclaiming said loose bulk material continuously from the highest portions of said storage pile.

* * * * *